Aug. 11, 1942.   H. SINCLAIR   2,292,776
VARIABLE SPEED POWER TRANSMISSION GEARING
Filed Dec. 23, 1938   2 Sheets-Sheet 1

INVENTOR
*Harold Sinclair*
BY
ATTORNEYS

Aug. 11, 1942.   H. SINCLAIR   2,292,776
VARIABLE SPEED POWER TRANSMISSION GEARING
Filed Dec. 23, 1938   2 Sheets-Sheet 2

INVENTOR
*Harold Sinclair*
BY
*Dean Fairbank & Hirsch*
ATTORNEYS

Patented Aug. 11, 1942

2,292,776

UNITED STATES PATENT OFFICE 2,292,776

VARIABLE SPEED POWER TRANSMISSION GEARING

Harold Sinclair, Kensington, London, England

Application December 23, 1938, Serial No. 247,428
In Great Britain December 24, 1937

3 Claims. (Cl. 74—328)

This invention relates to power-transmission toothed wheel gearing of the planetary type adapted to be driven by a continuously running driving machine and to yield a plurality of forward speed ratios, such for example as is suitable for use on a motor vehicle.

An object of this invention is to provide such a gearing which is particularly adapted to be connected to the driving machine by a hydraulic power transmitter (e. g. hydraulic coupling) of the kinetic type.

A further object is to provide in a planetary gearing an improved arrangement for enabling rapid gear changes to be effected while the system is operating and also for enabling the driven shaft to be disengaged and progressively re-engaged, for example in changing to and from neutral when the driven shaft is stationary.

My Patent No. 2,245,017 describes change-speed gears capable of synchronous self-shifting between the different gear ratios, and another object of the present invention is to provide an improved arrangement of such synchro-self-shifting gear.

Other objects and advantages of the invention will be apparent from the following description of an embodiment of the invention with reference to the accompanying diagrammatic drawings, in which.

Figure 1:
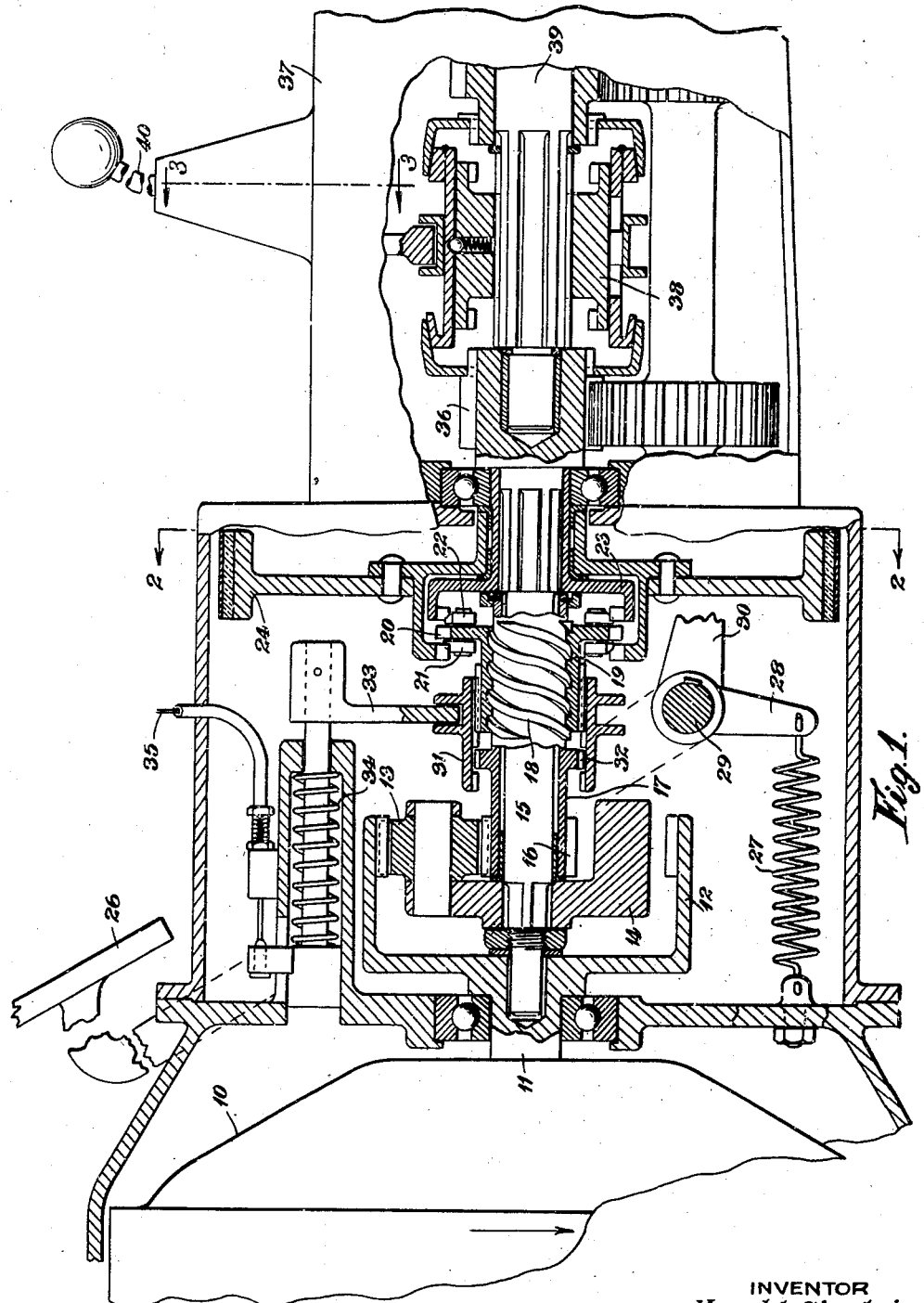
Fig. 1 is a part-sectional side elevation of part of the power transmission system of an automobile.
Figure 2:
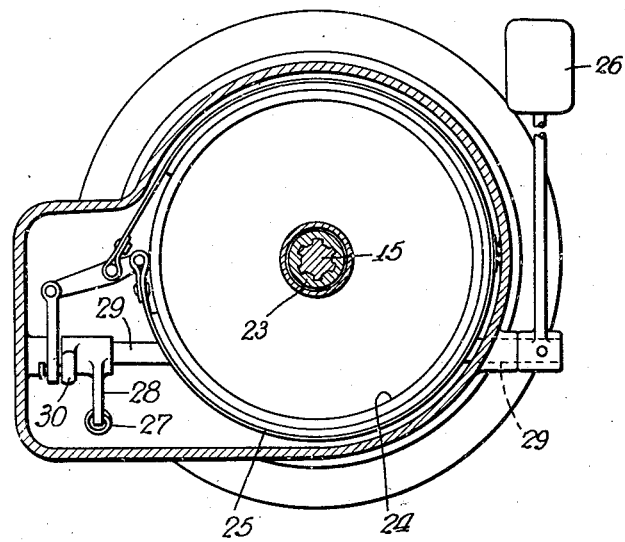
Fig. 2 is a section, to a smaller scale, on the line 2—2 in Fig. 1.

Referring to Figs. 1 and 2, the engine (not shown), which rotates in the direction indicated by the arrow, is coupled either directly, or through a hydraulic coupling 10 of the kinetic type, to the input shaft 11 of a two-speed planetary synchro-self-shifting gear yielding a direct drive and an indirect low-speed ratio. This gear is somewhat similar to that shown in Fig. 2 of my Patent No. 2,245,017 (hereinabove referred to) except that it does not yield a reverse gear and the input and output ends are transposed. Thus the input shaft 11 drives an internally toothed annulus 12 meshing with planet wheels, such as 13, journalled on a planet carrier 14 fast with the output shaft 15. These planet wheels mesh with a sun wheel 16 formed on a sleeve shaft 17 journalled on the output shaft and having a left-handed coarse-pitch screw thread 18 on its exterior. A nut 19 is engaged on this thread and is provided with teeth 20 engageable, as the nut moves helically one way and the other on the sleeve 17, alternatively, under the control of oppositely facing pawls 22 and 21 respectively, with a toothed member 23 fast with the output shaft 15, and with a toothed reaction brake drum 24 which is capable of rotation. A brakeband 25 can be disengaged by a control member, e. g. a pedal 26, from the drum 24. The brake band is normally kept contracted on the drum by a tension spring 27 acting on an arm 28 fixed to the pedal shaft 29, which actuates the brake band through an arm 30.

The nut 19 is provided with a locking sleeve 31 which is preselectively controllable to bias it towards, and to lock it in, high- and low-speed positions, by engaging its two sets of internal splines alternatively with splines 32 on the sun sleeve 17. The locking sleeve is actuated by a striking yoke 33 biased towards the low-speed position by a spring 34 and capable of being displaced into the high-speed position by a control lever connected to a flexible cable 35.

Figure 3:
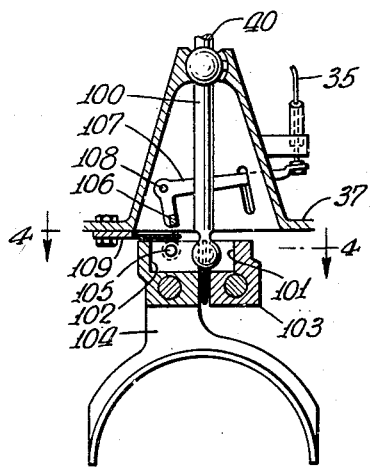
Fig. 3 is a section of a detail taken on the line 3—3 in Fig. 1.
Figure 4:
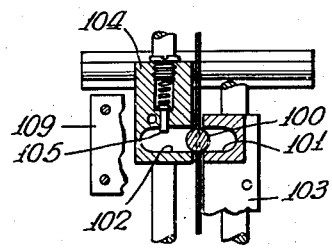
Fig. 4 is a sectional plan on the line 4—4 in Fig. 3.

The output shaft 15 of the planetary unit is integral with the input pinion 36 of a countershaft gear 37 yielding, say, three forward speeds and reverse and provided with synchromesh clutches for establishing at least the highest two forward ratios. These synchromesh clutches, as shown in Fig. 1, are of the conventional inertia-lock type having a common driven dog 38 slidable on and splined to the driven shaft 39. The gear changing in the countershaft gear may be carried out by the usual lever 40 movable in an H shape so-called "invisible gate." As shown in Figs. 3 and 4, the lever 40 has a tail 100 cooperating in the usual way with transverse recesses 101 and 102 respectively in a shift rail 103 for first and reverse speeds and a shift rail 104 for second and third speeds. The recess 102 is elongated, and a spring-loaded plunger 105 normally projects into this recess far enough to restrain transverse movement of the tail lever 100. A bar 106 adapted to be engaged by the tail lever 100 is mounted on a bell-crank lever 107 pivoted at 108 to the casing of the gearing 37 and engaging with the pre-selector control cable 35. A rectangular plate 109 is fixed to the inside of the gear casing and serves to engage the tail lever 100 and prevent the latter from moving transversely beyond the plunger 105 unless the gear lever 40 is in the second or third gear position. When the gear lever is in any of the conventional gear positions, the bell-crank lever 107 is in the position shown and the planetary unit is accordingly locked in or preselected to the low-speed ratio. Movement of the gear lever laterally from the third (and if desired also the second) gear position causes the tail lever 100 to move in front of (or behind) the plate 109, depressing and engaging behind the plunger 105, and displacing the bar 106 so as to rock the bell-crank lever 107 and thus preselect the high-speed ratio in the planetary unit. The plunger spring is strong enough to hold the gear lever thus displaced against the pull of the spring 34 (Fig. 1).

In operation, with the engine running and the countershaft unit 37 in neutral, the pedal 26 is depressed, and as the planetary unit is locked in low gear, i. e. the teeth 20 are engaged with the brake drum 24, the brake drum 24 can spin idly backwards when the input shaft 15 of the countershaft unit is arrested owing to engagement of a gear therein, for example first gear. As the pedal is released, the brake drum is gradually arrested by the brake band and the vehicle is set smoothly in motion. Changes up to second and third gears in the countershaft unit are made in the usual way, the pedal 26 being depressed to allow the synchromesh clutches to regulate the speed of the input shaft 15 of the countershaft gear. To change from third to fourth gear, the gear lever 40 is urged laterally to actuate the cable 35 and thereby preselect direct drive in the planetary unit and the engine is momentarily decelerated sufficiently to disengaged the nut 19 from the reaction drum 24 and to cause it to engage and become locked with the toothed member 23. To change from fourth to third gear the gear lever 40 is returned to the third gear position to preselect the indirect gear in the planetary unit, the engine is decelerated only sufficiently to unload the locking sleeve 31 and to allow it to unlock the direct drive, and the engine is immediately thereafter accelerated to engage the indirect gear in the planetary unit, which becomes locked in that gear. Changes to still lower speeds are made while the pedal is kept depressed.

I claim:

1. Change-speed gearing comprising an input shaft, an output shaft, a planetary gear train having three co-operating relatively rotatable elements the first and second of which are connected respectively to said shafts and the third of which serves as a reaction element, a rotatable first jaw-clutch member, control means operable for progressively arresting said jaw-clutch member, a second jaw-clutch member rigid with one of said first and second planetary gear elements, a third jaw-clutch member constrained to move obliquely with respect to said reaction element between positions in which it is engaged respectively with said first and second jaw-clutch members, pawls associated with at least one of said jaw-clutch members for effecting smooth engagement of the jaw-clutch teeth, and controllable locking means operable, when said second and third jaw-clutch members are engaged together, to prevent their disengagement.

2. Change-speed gearing comprising an input shaft, an output shaft, a planetary gear having an annulus gear element rigid with said input shaft, a planet-carrier element rigid with said output shaft and a sun gear element, a rotatable first jaw-clutch member, control means operable for progressively arresting said jaw-clutch member, a second jaw-clutch member rigid with said planet-carrier element, a third jaw-clutch member constrained to move helically with respect to said sun gear element and engageable, in the course of such helical movement, alternatively with said first and second jaw-clutch members, auxiliary synchronising means associated with at least one of said jaw-clutch members and co-operating with other of said jaw-clutch members for effecting engagement of the jaw-clutch teeth, and controllable locking means operable for maintaining said second and third jaw-clutch members engaged together when driving torque is being transmitted through the gearing.

3. A planetary toothed-wheel gear having a brakeable element, three cooperating relatively rotatable elements the first and second of which serve respectively as the input and output elements and the third of which serves as the reaction element of the gear and includes helical torque-transmitting surfaces and a set of jaw-clutch teeth, said teeth being alternatively engageable with a set of jaw-clutch teeth associated with said brakeable element and a set of jaw-clutch teeth associated with one of said input and output elements, pawls on at least one of said jaw-clutch toothed elements for cooperation with the jaw-clutch teeth on the others thereof to provide two subsidiary unidirectional drives, the first of which operates to clutch together said brakeable element and said reaction element under the influence of driving torque reaction on said helical surfaces and the second of which operates to clutch together said one of the input and output elements and said reaction element under the influence of overrunning torque reaction on said helical surfaces, control means operable to permit and prevent unclutching of said last-mentioned two elements under driving torque reaction to establish respectively underdrive and direct drive ratios while the gear is running, and control means operable for progressively restraining rotation of said brakeable element to permit smooth interruption and resumption of the underdrive ratio.

HAROLD SINCLAIR.